United States Patent [19]

Ogita

[11] Patent Number: 5,218,693
[45] Date of Patent: Jun. 8, 1993

[54] TIMER UNIT AND DATA PROCESSING APPARATUS INCLUDING THE SAME

[75] Inventor: Kiyoshi Ogita, Tokyo, Japan

[73] Assignees: Hitachi, Ltd.; Hitachi Microcomputer Engineering Ltd., Tokyo, Japan

[21] Appl. No.: 719,965

[22] Filed: Jun. 24, 1991

Related U.S. Application Data

[62] Division of Ser. No. 384,307, Jul. 24, 1989, Pat. No. 5,058,050.

[30] Foreign Application Priority Data

Jul. 29, 1988 [JP] Japan .................. 63-189927

[51] Int. Cl.⁵ ............................................ G06F 1/04
[52] U.S. Cl. .................. 395/550; 364/DIG. 2;
 364/933.3; 364/934.1; 364/942.7
[58] Field of Search ............... 364/DIG. 1, DIG. 2, 364/569; 395/550

[56] References Cited

U.S. PATENT DOCUMENTS

| | | | |
|---|---|---|---|
| 3,546,679 | 12/1970 | Yokoyama et al. | 364/DIG. 2 |
| 3,568,162 | 3/1971 | Toy | 364/DIG. 2 |
| 3,728,683 | 4/1973 | Biegert et al. | 364/DIG. 2 |
| 3,862,372 | 1/1975 | Deutsch | 364/DIG. 2 X |
| 4,538,235 | 8/1985 | Henning | 364/569 |
| 4,564,918 | 1/1986 | McNally et al. | 364/569 |
| 4,764,687 | 8/1988 | Hamilton et al. | 364/569 |

FOREIGN PATENT DOCUMENTS

| | | |
|---|---|---|
| 57-174722 | 10/1982 | Japan . |
| 61-3223 | 1/1986 | Japan . |
| 62-131303 | 6/1987 | Japan . |

*Primary Examiner*—Thomas M. Heckler
*Attorney, Agent, or Firm*—Fay, Sharpe, Beall, Fagan, Minnich & McKee

[57] ABSTRACT

A digital timer unit employs a capture register and a save register. The capture register latches count data provided from a counter in accordance with a first edge of an event pulse. The save register latches count data of the capture register in accordance with a second edge of the event pulse while the capture register latches new count data provided from the timer. Data within the capture register and the save register after completion of the event pulse define a duration of an event pulse with a relatively small duration.

7 Claims, 5 Drawing Sheets

FIG. 5A

CONTROL REGISTER

| BUFE | IEGA | IEGB | EICA | EICB | EICC | ICFA | ICFB |
|------|------|------|------|------|------|------|------|

FIG. 5B

CONTROL REGISTER

| BUFE | IEGA 1 | IEGA 2 | IEGB 1 | IEGB 2 | EICA | EICB | EICC |
|------|--------|--------|--------|--------|------|------|------|

TIMER UNIT AND DATA PROCESSING APPARATUS INCLUDING THE SAME

This is a divisional of co-pending application Ser. No. 384,307 filed Jul. 24, 1989 now U.S. Pat. No. 5,058,050.

BACKGROUND OF THE INVENTION

The present invention relates to technology for obtaining time data directed to monitoring the generation of a selected event and to monitor a change in the event. More specifically, the invention relates to technology that can be effectively adapted to a data processing apparatus such as a micro computer including a timer unit.

In order to obtain time data for monitoring the generation of an event and a change in the event, a conventional timer unit included in the micro computer is provided with a free-running counter and a capture register. The free-running counter is adapted to count basic clock signals of a predetermined frequency. The capture register latches the counted data of the free-running counter in synchronization with the rise or break of event pulses supplied from an external unit. As the capture register latches the counted data, the timer unit interrupts the central processing unit (hereinafter referred to as CPU) and uniforms it of the generation or change of a selected event. Then the CPU reads the counted data latched by the capture register and obtains time data related to the generation or change of the event.

For example, when the time between two generated consecutive selected events is to be measured, the CPU transfers the counted data latched by the capture register to a memory to save it, and calculates a difference between the latched data in the capture register and the above saved data in order to obtain the elapsed time between the events.

The data processing apparatus, including the timer unit, has been disclosed in Japanese Patent Laid-Open No. 3223/1986.

In the prior art, when a second selected is generated subsequent to the generation of a first event it becomes necessary to save the counted data latched by the capture register in response to the generation of the first selected event before the capture register is renewed by the generation of the second selected event. If the first and second selected events are separated by a short time interval the processing for saving the latched data into the memory by the CPU may not be carried out before the latched data in the capture register are renewed. Therefore, when measuring pulses having small duration or when measuring pulses separated by a short time interval, the precision of time measurement is are limited to the time required by the CPU to make access to the capture register and to save the latched data. Accordingly, the precision of the timer unit for measuring time becomes quite rough.

The object of the present invention is to provide a timer unit capable of improved precision for measuring the time data and for improving limits for measuring a minimum elapsed time.

Another object of the present invention is to provide a data processing apparatus which measures time with high precision.

A further object of the present invention is to provide a data processing apparatus which can easily transfer the data among the timekeeping registers.

The above and other objects as well as novel features of the present invention will become obvious from the description of the specification and the accompanying drawings.

SUMMARY OF THE INVENTION

Among the inventions disclosed in this application, a representative example will now be described briefly.

That is, the invention deals with a timer circuit having a capture register that latches the timekeeping data. The timekeeping data is produced from timekeeping means based on a change in an event pulse. The improvement comprises making provision of a save register which receives the timekeeping data latched in the capture register and latches the timekeeping data in a manner enabling it to be read at any time. The timing for latching the data to the save register is interlocked to the change in said event pulse.

The invention further deals with a timer unit in which timekeeping data produced from timekeeping means are individually latched, based on a change in the individual event pulses, to a plurality of capture registers. The capture registers are assigned to event pulses of different series in a manner that enables the latched timekeeping data to be read out at any time, the improvement being the ability for a predetermined capture register to also be used as said save register, by making provision of first selection means to selectively give to a second capture register either the timekeeping data latched to the first capture register or the timekeeping data produced from the timekeeping means. In the event the first selection means selects the timekeeping data latched to the first capture register, the event pulses of the two systems are changed the event pulses of the two systems are changed over in response to the condition such that the timings for latching the data to the first and second capture registers can be controlled based on the same event pulse.

According to the aforementioned means, when a second selected event is generated subsequent to the generation of a first selected event the timekeeping data latched to the capture register in response to a change in the event pulse due to the generation of a previous event are stacked in a save register. The timing of this stacking is interlocked to a change in the event pulse based on the hardware constitution of the timer unit and occurs before the capture register is renewed by the generation of the second selected event. That is, when two or more events by are generated and separated a short time interval, the data stored in the capture register or the save register are arbitrarily read out at any moment to reliably obtain the width of pulse and the time interval for generating events. This process is completed without accessing the latched data by an external module such as CPU to save the latched data before the data latched in the capture register are renewed. By storing the data in this manner, the smallest measurable unit of time is no longer constrained to. the time requires for the CPU or the like to make access to the capture register to save the latched data. Because this constraint is removed, smaller units of time can be measured and accuracy is improved. Furthermore, the limit or precision for measuring the time by the timer unit is prevented from becoming very rough for the period of basic clock signals from the timekeeping means, in order to improve reliability of the timer unit.

BRIEF DESCRIPTION OF THE DRAWINGS

FIGS. 5A and 5B are diagrams illustrating control registers.

DESCRIPTION OF THE PREFERRED EMBODIMENTS

Figure 3:
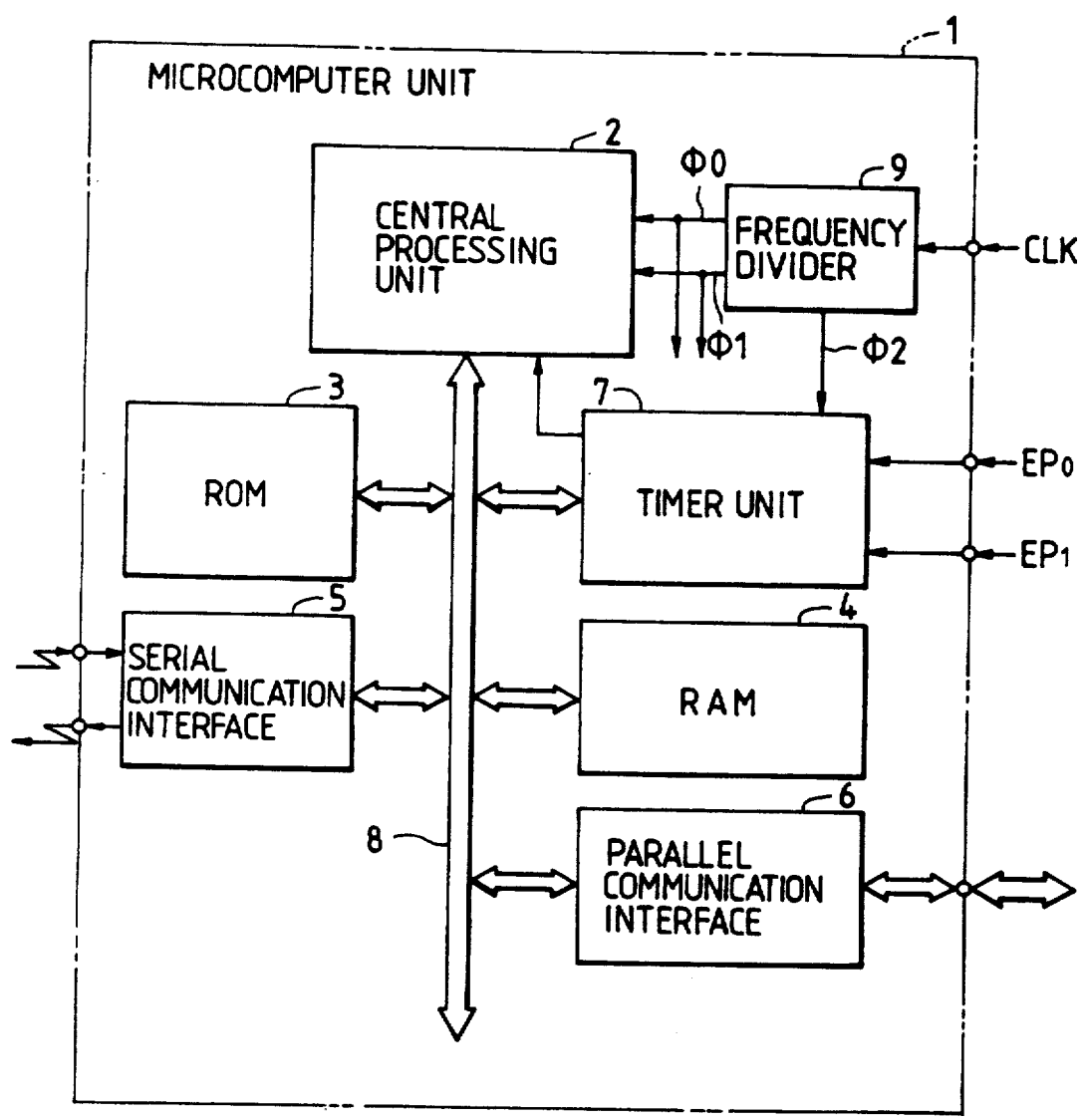
FIG. 3 is a block diagram of a micro computer to which is adapted the timer unit according to the present invention.

FIG. 3 illustrates a micro computer to which is adapted a timer unit according to the present invention. Though there is no particular limitation, the micro computer shown in FIG. 3 is formed on a semiconductor substrate such as a silicon substrate by technology for producing semiconductor integrated circuits.

Though there is no particular limitation, the micro computer 1 includes a CPU 2 for controlling the internal execution units according to a program, a ROM (read-only memory) 3 which stores operation programs of the CPU 2, a RAM (random-access memory) 4 which chiefly offers operation region for the CPU 2, a serial communication interface 5, a parallel communication interface 6, and a timer unit 7, which are connected together via an internal bus 8. In FIG. 3, the internal address bus, internal data bus and internal control signal bus are represented by the internal bus 8 to simplify the drawing.

Though not specifically diagrammed, the CPU is constituted by a program counter which indicates the address of an instruction to be fetched from the ROM 3, an instruction register from which will be successively fetched instructions of a program, a micro ROM storing a microprogram, a micro address controller which forms address information for addressing the micro ROM based upon an address portion of the instruction fetched to the instruction register or data of next address field of the micro instruction, a micro instruction decoder which forms a control signal by decoding the micro instruction read out from the micro ROM, a logic operation unit whose operation is controlled based on control signals produced from the micro instruction decoder, and various registers such as accumulators.

Though there is no particular limitation, the micro computer 1 is served with clock signals CLK from an external unit. The clock signals CLK are divided according to their frequency by a frequency divider 9 to form clock signals $\phi_0$, $\phi_1$ and $\phi_2$. Though there is no particular limitation, the clock signals $\phi_0$ and $\phi_1$ are supplied as operation clock signals to the CPU 2 and other units so that they will operate in synchronization with the operation clock signals $\phi_0$ and $\phi_2$.

Though there is no particular limitation, the timer unit 7 is served with clock signals $\phi_2$ having a frequency higher than those of the operation clock signals $\phi_0$ and $\phi_1$, and carries out the timekeeping operation in synchronization with the clock signals $\phi_2$. As will be described later, the timer unit 7 realizes a comparing function which compares the timekeeping data obtained by the timekeeping operation in synchronization with the clock signals $\phi_2$ with the time data given from the CPU 2, and produces a timer signal when they are in agreement. The timer unit 7 further realizes a time data obtaining function (capturing function) which latches the timekeeping data in synchronization with the rise or break of signals such as event pulses $EP_0$ or $EP_1$ supplied from an external unit and gives them to the CPU 2 to monitor the generation or change of required events.

In FIG. 3, open circles represent external terminals provided on the micro computer 1. The clock signals CLK formed by an external oscillation circuit that is not diagramed are supplied to the frequency divider 9 via an external terminal, and the event pulses $EP_0$, $EP_1$ are supplied to the timer unit 7 via external terminals. Further, inputs and outputs of the serial communication interface 5 are input or output via external terminals, and the inputs and outputs of the parallel communication interface 6 are input or output via an external terminal.

Figure 1:
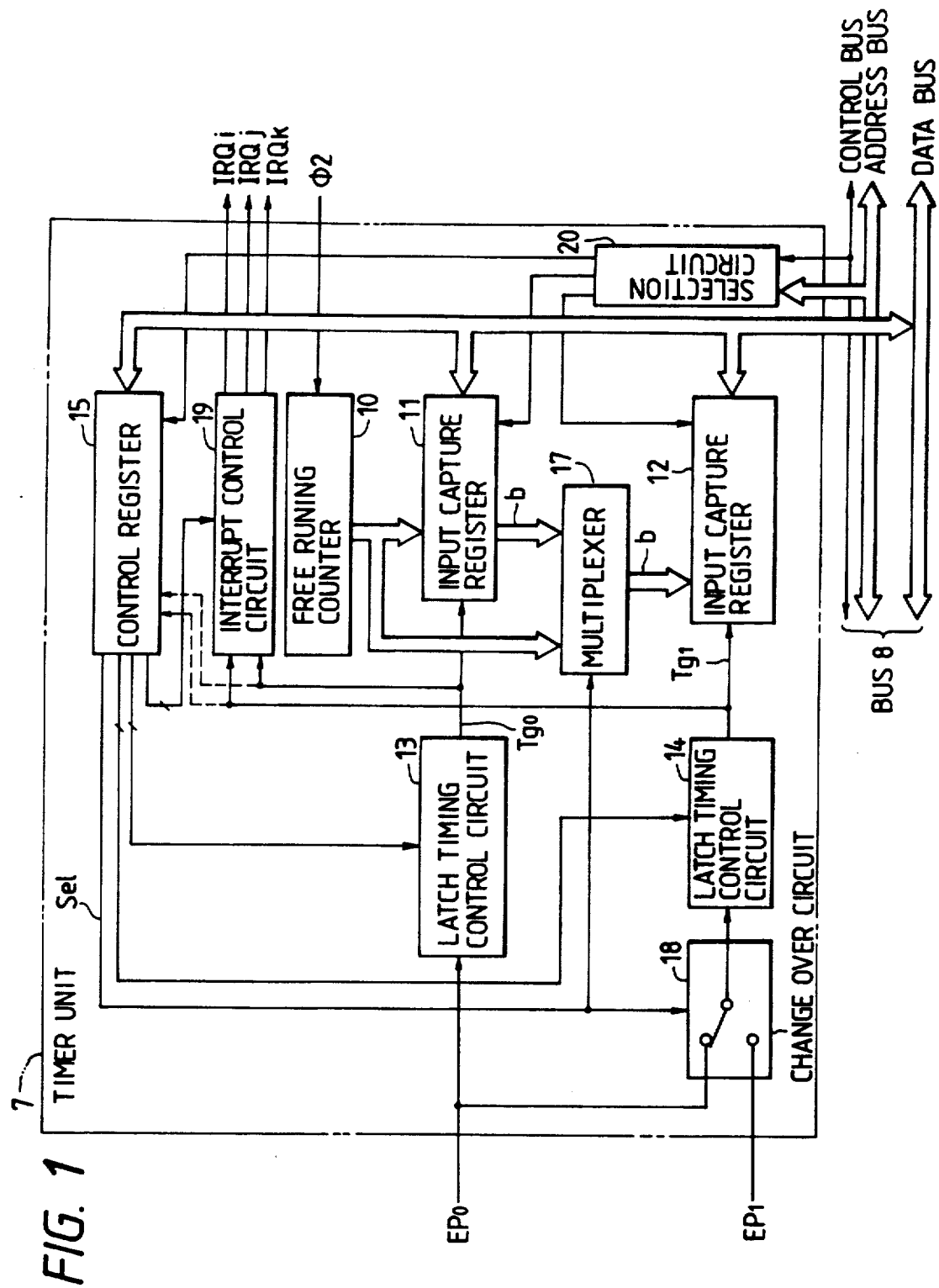
FIG. 1 is a block diagram illustrating a timer unit according to an embodiment of the present invention.

FIG. 1 illustrates an embodiment of the timer unit 7. To simplify the drawing, FIG. 1 representatively shows the constitution for realizing the capturing function.

Though there is no particular limitation, the timer unit 7 shown in FIG. 1 is equipped with a freerunning counter 10 that carries out timekeeping operations in synchronization in synchronism with the clock signals $\phi_2$, and with two input capture registers 11 and 12 that can latch timekeeping data of the free-running counter 10.

Though there is no particular limitation, each of the input capture registers 11 and 12 is constituted by a latch circuit of the type of parallel-in and parallel-out in which a predetermined number edge-triggering D-type flip-flop circuits are provided in parallel. Read access can be freely made to the capture registers 11 and 12 by the central processing unit 2 via the internal bus 8. That is, the capture registers 11, 12 and a control register 15 that will be described later, are assigned to different addresses, and the CPU 2 forms an internal address signal that designates an address assigned to a register. Thus, the register is selected to read the data. For this purpose, the timer unit 7 is provided with a register selection circuit 20 which is served with internal address signals from the CPU 2 via internal address bus and with control signals from the CPU 2 via internal control signal bus. The register selection circuit 20 decodes the internal address signal and forms a selection signal for selecting the capture register 11 or 12 or the control register 15. Therefore, when the CPU 2 produces an internal address signal designating an address assigned, for example, to the capture register 11, a register selection signal is produced from the selection circuit 20 to the capture register 11. Similarly, when the CPU 2 produces an internal address signal designating the capture register 12, a register selection signal is sent to the capture register 12. When an internal address signal is produced designating the control register 15, a register selection signal is sent to the control register 15. The control signals supplied to the selection circuit 20 via the control signal bus include a strobe signal that indicates whether the internal address signal produced from the CPU 2 is effective or not, and like signals. Further, though not diagramed in FIG. 1, the capture registers 11, 12 and the control register 15 are served with read/write signals from the CPU 2. Though not specifically limited, the capture registers 11 and 12 serve as read-only units for the internal data bus, and the control register 15 serves as a read/write unit for the internal data bus.

The input node (parallel input) of the capture register 11 is coupled to the output node of the free-running counter 10, and the output node (parallel output) of the capture register 11 is coupled to one input node of the multiplexer 17 that will be described later and to the internal data bus via a gate circuit (not shown) that is controlled by the selection signal from the selection circuit 20 and by the read/write signal. When the read/write signal indicates the read condition, the gate circuit that is not shown transmits the data held in the capture register 11 to the internal data bus in response to the selection signal. To the other input node of the multiplexer 17 is coupled the output node of the free-running counter 10.

The capture register 12 has its input node (parallel input) connected to the output node of the multiplexer 17 and has its output node (parallel output) connected to the internal data bus via a gate circuit (not shown) that is controlled by the selection signal from the selection circuit 20 and by the read/write signal. When the read/write signal indicates the read condition, the gate circuit transfers the data held in the capture register 12 to the internal data bus in response to the selection signal.

When the read/write signal indicates the write condition, the control register 15 receives the data on the internal data bus and holds them in response to a selection signal from the selection circuit 20. When the read/write signal indicates the read condition, the control register 15 transfers the data held therein to the internal data bus in response to the selection signal.

Though there is no particular limitation, the two kinds of event pulses $EP_0$ and $EP_1$ of different series supplied to the timer unit 7 rise or break depending upon the generation or change of a predetermined event, and are produced from the sensors of an external unit controlled, for example, by the micro computer 1 of this embodiment. The sensors detect predetermined events to change the levels of their specific event pulses $EP_0$ and $EP_1$. For instance, when the external unit assumes a first condition, the first sensor changes the event pulse $EP_0$ from the low level to the high level and when the external unit assumes other condition, the first sensor changes the event pulse $EP_0$ from the high level to the low level. When the external unit assumes a second condition, furthermore, the second sensor changes the event pulse $EP_1$ from the high level to the low level and when it assumes other condition, the second sensor changes the event pulse $EP_1$ from the low level to the high level.

The two capture registers 11 and 12 are corresponded to two kinds of event pulses $EP_0$ and $EP_1$ of different series to separately latch the timekeeping data, i.e., to latch counted data produced from the free-running counter 10 based upon the rise or break of the individual event pulses $EP_0$ and $EP_1$. The timings for latching the data by the capture registers 11 and 12 are controlled by the latch timing control circuits 13 and 14 based upon changes in the event pulses $EP_0$ and $EP_1$ that are supplied individually.

The latch timing control circuits 13 and 14 have a function for detecting the edges of event pulses $EP_0$ and $EP_1$ that are supplied individually. Upon detecting a required edge, the latch timing control circuits 13 and 14 give trigger signals $Tg_0$ and $Tg_1$ with a rising edge to control terminals of the capture registers 11 and 12, i.e., to clock input terminals of the D-type flip-flop circuits. The capture registers 11 and 12 latch the data supplied to the input nodes thereof in response to rising edges of the trigger signals $Tg_0$ and $Tg_1$. The kinds of edges of the vent pulses $EP_0$ and $EP_1$ detected by the latch timing control circuits 13 and 14 are programably set depending upon the content of the control register 15. Therefore, the trigger signals $Tg_0$ and $Tg_1$ having a rising edge are given to the capture registers 11 and 12 in synchronization with the rise, break, or both the rise and break of the event pulses $EP_0$ and $EP_1$. As described earlier, read/write access can be made by the CPU 2 to the control register 15 via the internal bus 8.

The above description related to the timer unit 7, i.e., assigning one capture register to one event pulse, is fundamentally the same as the capturing function in an ordinary timer unit. In addition to the above function, however, the timer unit 7 of this embodiment is capable of selecting a function for utilizing the capture register 12 for saving the data latched in the capture register 11 in order to improve precision for measuring time data or to improve limit for measuring a minimum time.

In order to realize this function, provision is made of a multiplexer 17 which selectively gives either the counted data latched by the capture register 11 or the counted data produced from the free-running counter 10 to the other capture register 12, and provision is further made of an event pulse changeover circuit 18 which changes over the event pulse given to the latch timing control circuit 14 to either the event pulse $EP_0$ or $EP_1$. The multiplexer 17 and the event pulse changeover circuit 18 are controlled for their operations by a selection signal Sel produced from the control register 15. When the multiplexer 17 assumes the condition for selecting the counted data latched by the capture register 11, the event pulse change-over circuit 18 is controlled in response thereto to select the event pulse $EP_0$.

Therefore, the timer unit 7 selects a first mode in which the data latch timing for the capture register 11 is synchronized with a change in the event pulse $EP_0$ and the data latch timing for the capture register 12 is synchronized with a change in the event pulse $EP_1$, and a second mode in which the data latch timing for the capture registers 11 and 12 connected substantially in series is synchronized with a change in the event pulse $EP_0$.

The interrupt control circuit 19 shown in FIG. 1 is served with trigger signals $Tg_0$, $Tg_1$ produced from the latch timing control circuits 13 and 14. Though there is no particular limitation, when the first mode is set to the timer unit 7 according to the set condition of the control register 15, the interrupt control circuit 19 compares the conditions of the trigger signals $Tg_0$, $Tg_1$ with the condition which is set in advance to the control register 15, and gives interrupt signals IRQi and IRQj to the central processing unit 2 when they are in agreement. The interrupt signals IRQi and IRQj individually work to let the CPU learn the generation of event assigned to the event pulses $EP_0$ and $EP_1$. Further, though there is no particular limitation, when the second mode is set to the timer unit 7 according to the set condition of the control register 15, the interrupt control circuit 19 compares the conditions of the trigger signals $Tg_0$, $Tg_1$ with the condition set in advance to the control register 15, and gives an interrupt signal IRQk to the CPU 2 when they are in agreement. The interrupt signal IRQk works to let the CPU 2 learn the generation of an event assigned to the event pulse $EP_0$.

FIG. 5B illustrates an embodiment of the control register 15 which is constituted by eight bits, each bit having its own meaning.

That is, a bit BUFE is a buffer enable bit on which is written, for example, "1" such that the selection signal Sel has such a potential as to instruct the multiplexer 17 to transfer the data held in the capture register 11 to the input node of the capture register 12, and as to instruct the event pulse change-over circuit 18 to transfer the event pulse $EP_0$ to the latch timing control circuit 14. In other words, the second mode is set when "1" is written onto the buffer enable bit BUFE and the first mode is set when "0" is written thereon. Bits IEGA1 and IEGA2 are input edge bits for controlling the operation of the latch timing control circuit 13. The contents of these bits determine to which edge (rise, break, or both) of the event pulse that is supplied the latch timing control circuit 13 responds. When, for instance, "0" and "0" are set to the input edges IEGA1 and IEGA2, the latch timing control circuit 13 forms a trigger signal having a rising edge in response to the rise of the event pulse. When "0" and "1" are set, the trigger signal is formed in response to the break of the event pulse, and when "1" and "0" are set, the trigger signal is formed in response to both the rise and break of the event pulse. The bits IEGB1 and IEGB2 are the same as the above input edge bits IEGA1 and IEGA2. Here, however, the input edge bits IEGB1 and IEGB2 work to control the operation of the latch timing control circuit 14. The function thereof therefore can be easily comprehended if the latch timing control circuit 13 in the foregoing description is read as the latch timing control circuit 14.

Figure 2:
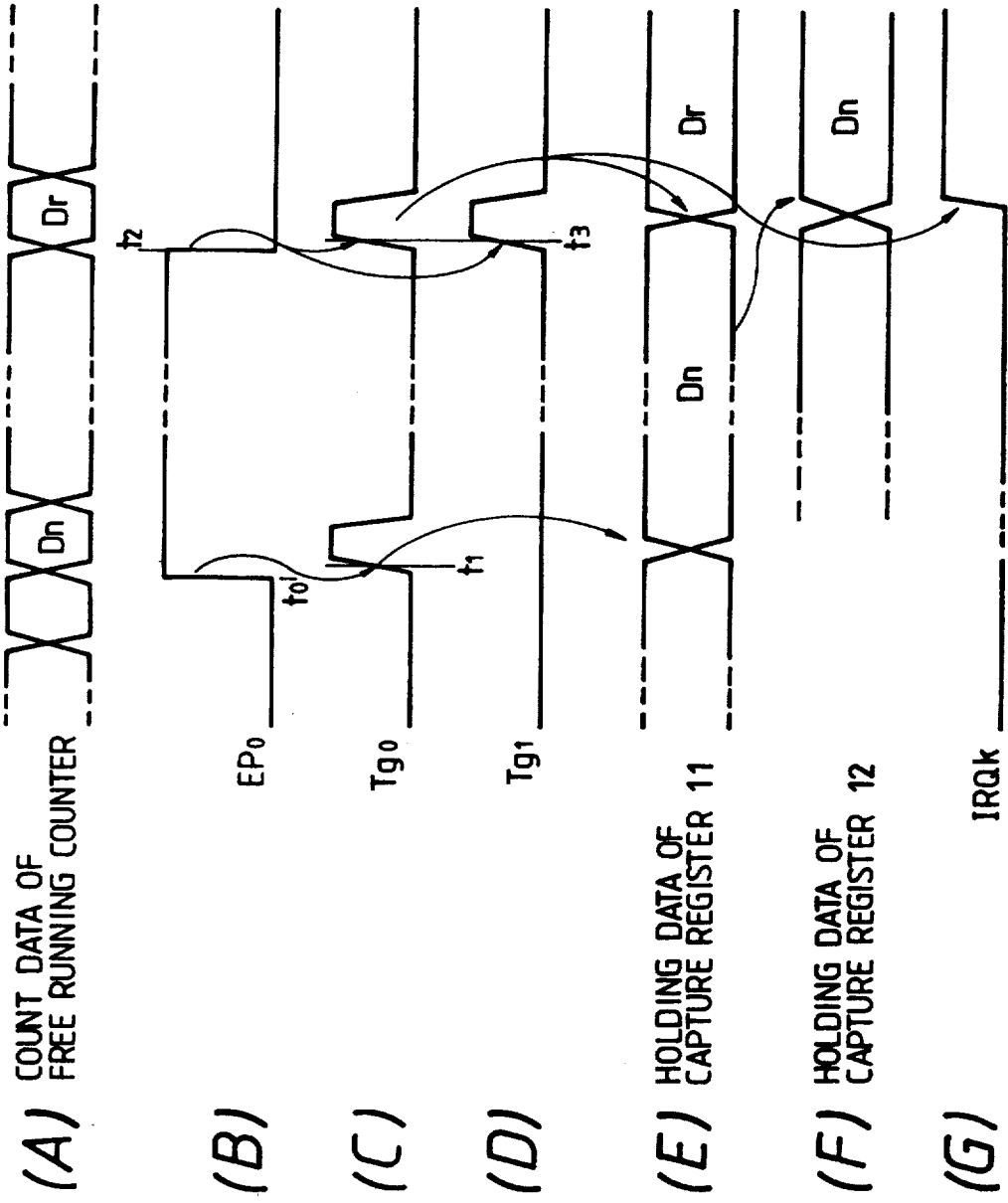
FIGS. 2(A)-(G) are a timing chart illustrating an example of operation of the timer unit of FIG. 1.

Bits EICA, EICB and EICC are capture interrupt enable bits, and the signals from these bits are supplied to the interrupt control circuit 19. When the trigger signal $Tg_0$ is formed, the capture interrupt enable bit EICA determines whether the interrupt signal IRQj be formed or not. When the trigger signal $Tg_1$ is formed, the capture interrupt enable bit EICB determines whether the interrupt signal IRQj be formed or not. When, for example, an interrupt permit flag "1" is written in advance on the capture interrupt enable bit EICA (EICB), the interrupt control circuit 19 forms an interrupt signal IRQi (IRQj) in response to the generation of the trigger signal $Tg_0(Tg_1)$. Further, when the second mode is set, the capture interrupt enable bit EICC determines whether the interrupt signal IRQk be formed or not in response to the trigger signals $Tg_0$, $Tg_1$. With the interrupt permit flag being written in advance on the capture interrupt enable bit EICC, the interrupt control circuit 19 generates an interrupt signal IRQk after a trigger signal having a rising edge is generated three times as will be described later with reference to FIG. 2. Though there is no particular limitation, the interrupt control circuit 19 is served with a control signal from the buffer enable bit BUFE so as to discriminate the mode that is set. As will be comprehended from the above description, data representing desired conditions are written in advance on these bits by the CPU 2. Further, the conditions set in advance can be read by the CPU 2.

The operation of the aforementioned embodiment will now be described in conjunction with FIGS. 2(A) to 2(G).

The following description of operation deals with the case where the timer unit set to the second mode measures the width of the event pulse $EP_0$ that rises by the generation of the first event and that breaks by the generation of the second event.

The control register 15 is set to the second mode in advance by the CPU 2. Then, the multiplexer 17 is controlled to select the data latched in the capture register 11 and to send them to the capture register 12, and the event pulse switching circuit 18 is controlled to supply the event pulse $EP_0$ to the latch timing control circuit 14.

When the width of the event pulse $EP_0$ is to be measured, the latch timing control circuit 13 is initialized for its operation via the control register 15 so as to give a trigger signal $Tg_0$ with a rising edge to the capture register 11 upon detecting both the rise and break of the event pulse $EP_0$. Further, the latch timing control circuit 14 is initialized so as to give a trigger signal $Tg_1$ with a rising edge to the capture register 12 upon detecting the break of the event pulse $EP_0$. The interrupt control circuit 19 is initialized so as to assert the interrupt signal IRQk after every three times of rise of the trigger signals $Tg_0$, $Tg_1$.

After the second mode is set to the timer unit 7, the event pulse $EP_0$ rises at a time $t_0$ (FIG. 2(B)) which is then detected by the latch timing control circuit 13, and rising edge of the trigger signal $Tg_0$ changes at a time $t_1$ (FIG. 2(C)). Then, the capture register 11 latches the counted data Dn of the free-running counter 10 of that moment.

Then, the event pulse $EP_0$ that breaks at a time $t_2$ is detected by the latch timing control circuits 13 and 14, and the rising edge of the trigger signals $Tg_0$, $Tg_1$ is changed at a time $t_3$. The capture register 11 latches the counted data Dr of the free-running counter 10 at that moment. When the capture register 11 latches the counted data Dr, the counted data Dn corresponding to the previous time of generating the event have already been saved from the capture register 11 to the capture register 12 via the multiplexer 17.

Thus, as the required counted data Dr and Dn are latched by the capture registers 11 and 12, the interrupt signal IRQk is asserted, whereby the CPU 2 makes access to read the data latched in the capture registers 11 and 12, and calculates the difference between the counted data Dr and the counted data Dn that are read, in order to obtain data corresponding to the width of the event pulse EP.

Though there is no particular limitation, the capture register 12 latches the counted data Dn transferred to the input node thereof in response to the rising edge of the trigger signal $Tg_1$. In this case, since the data Dn held in the capture register 11 have been transferred to the input node of the capture register 12 in advance via the multiplexer 17, the data at the input node of the capture register 12 do not readily change from the counted data Dn into the data Dr even when the counted data Dr are newly latched by the capture register 11. This makes it possible to prevent the capture register 12 from latching the counted data Dr instead of the counted data Dn.

With the operation for measuring the width of the event pulse $EP_0$ being processed according to the above-mentioned first mode, when the counted data Dn are latched by the capture register 11 in synchronization with the rise of the event pulse $EP_0$, the CPU 2 must save the counted data Dn into a predetermined region of the RAM 4 before the data Dn latched by the capture register 11 are renewed into the data Dr by the break of the event pulse $EP_0$ in response to the generation of the next event.

Figure 4:
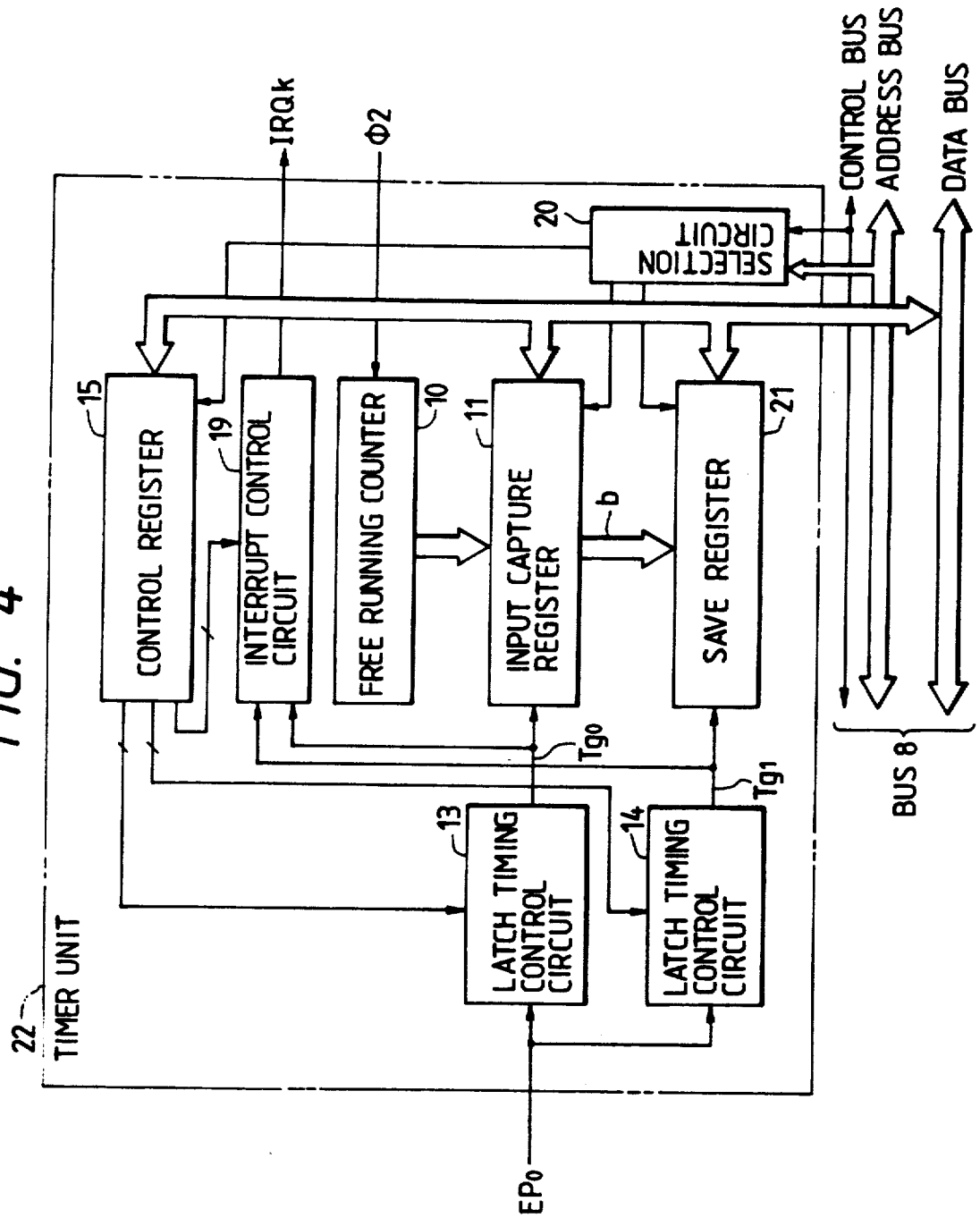
FIG. 4 is a block diagram of a timer unit according to another embodiment of the present invention.

FIG. 4 illustrates a timer circuit according to another embodiment of the present invention.

A timer unit 22 shown in FIG. 4 is contained in the micro computer 1. Here, however, the timer unit 22 is different from the timer unit 7 of FIG. 1 with regard to the capturing function. That is, provision is made of a save register 21 exclusively for saving the counted data latched by the capture register 11, whereby the function for capturing the event pulse $EP_0$ is realized by the two registers 11 and 12. In FIG. 4, the same circuit blocks as those of FIG. 1 are denoted by the same reference numerals, and their description is not repeated.

Even in the timer unit 22 constituted as shown in FIG. 4, when it is attempted to measure the width of the event pulse $EP_0$ that rises by the generation of the first event and that breaks by the generation of the second event like in the case of the embodiment of FIG. 1, the operation of the latch timing control circuit 13 is initialized through the control register 15 so that the trigger signal $Tg_0$ having rising edge is given to the capture register 11 upon detecting both the rise and break of the event pulse $EP_0$. Further, the latch timing control circuit 14 is so initialized as to give the trigger signal $Tg_1$ with rising edge to the save register 21 upon detecting the break of the event pulse $EP_0$. The interrupt control circuit 19 is so initialized as to assert the interrupt signal $IRQk$ every time when the rising edges of the trigger signals $Tg_0$ and $Tg_1$ are changed a total of three times. When the event pulse $EP_0$ rises under this condition, the trigger signal $Tg_0$ produced from the latch timing control circuit 13 rises, and the capture register 11 latches the counted data of the free-running counter 10 at that moment.

Then, the event pulse $EP_0$ that breaks is detected by the latch timing control circuits 13 and 14, and the trigger signals $Tg_0$ and $Tg_1$ rise. Then, the capture register 11 latches the counted data of the free-running counter 10 at that moment. When the data latched by the capture register 11 are renewed by the counted data, the counted data corresponding to the previous time of generating event have been saved already to the save register 21.

Even in this embodiment, the save register 21 latches the counted data that have been transferred in advance to the input node of the save register 21 in response to the rising edge of the trigger signal $Tg_1$. Since the counted data have been transferred in advance from the capture register 11 to the input node of the save register 21, the save register 21 latches the previous counted data that have been transferred to the input node thereof before the data changes at the output node of the register 11 when the capture register 11 latches newly counted data from the free-running counter 10. In order for the save register 21 to reliably latch the previous counted data, a delay circuit may be provided between the register 11 and the register 21.

Even in this embodiment like the embodiment of FIG. 1, the precision of time for measuring the generation or change of a selected event and a minimum interval for measuring consecutively generating events is not limited to the time required by the CPU 2 to make access to the capture register 11 and to save the latched data. This embodiment is provided with neither a multiplexer nor an event pulse change-over circuit that are shown in the embodiment of FIG. 1. Therefore, the control register does not particularly require the bit BUFE that was mentioned earlier. Furthermore, the bits EICA and EICB are not particularly required, either.

In the foregoing was described the invention accomplished by the present inventors by way of embodiments. The present invention, however, is in no way limited thereto only but can be modified in a variety of other ways without departing from the scope of the invention.

In the embodiment of FIG. 1, for example, the capture registers are connected in series in two steps using the multiplexer 17 and the event pulse change-over circuit 18, and the latter stage is utilized as the save register. It is, however, also allowable to increase the multiplexers and the event pulse change-over circuits in order to increase the number of stages of the capture registers connected in series. Even in the constitution described in the embodiment of FIG. 4, the save registers may be connected in a plurality of stages in series. When the save registers are to be connected in series (embodiment of FIG. 4) or when the capture registers under the serially connected condition are to be used as the save registers (embodiment of FIG. 1), access must be freely made to the registers by the CPU, and the registers must also be assigned to the event pulses (e.g., event pulses $EP_0$) of the same series. Therefore, the CPU makes access to a desired register in a random fashion to read operation data and to monitor the generation or change of a required event.

According to the above embodiment, furthermore, renewal of the latched data in the capture register or in the save register is reported by giving an interrupt signal to the CPU. This, however, may be done by any other means.

In FIG. 1, for instance, the bit constitution of the control register 15 is modified as shown in FIG. 5A such that the trigger signals $Tg_0$, $Tg_1$ are also supplied to the control register 15 as indicated by broken lines in FIG. 1.

In the control register 15 shown in FIG. 5A, the bit BUFE is a buffer enable bit which is the same as the buffer enable bit BUFE shown in FIG. 5B, the bit IEGA (IEGB) is an input edge bit for controlling the operation of the latch timing control circuit 13 (14), the bit ICFA (ICFB) is an input capture bit which sets a flag "1" in response to the rising edge of the trigger signal $Tg_0(Tg_1)$, and the bits EICA, EICB and EICC are capture interrupt enable bits that are the same as the capture interrupt enable bits EICA, EICB and EICC of FIG. 5B.

In the embodiment of FIG. 5A, the input edge bit for each latch timing control circuit 13(14) is 1 bit. Therefore, when, for example, "1" is set to the input edge bit IEGA (IEGB), the latch timing control circuit 13(14) detects the rising edge of the event pulse $EP_0(EP_1)$ to rise the trigger signal $Tg_0(Tg_1)$. When "0" is set to the input edge bit IEGA(IEGB), the latch timing control circuit 13(14) detects the breaking edge of the event pulse $EP_0(EP_1)$ to rise the trigger signal $Tg_0(Tg_1)$. As the trigger signal $Tg_0(Tg_1)$ rises, the flag "1" is raised to the input capture bit ICFA (ICFB). Therefore, read access is made to the control register 15 by the CPU 2 to detect the values of the input capture bits ICFA, ICFB, in order to determine whether the timekeeping data are held by the input capture registers 11 and 12 or not. That is, the conditions of the capture registers 11 and 12 can be learned by polling. According to this embodiment, though there is no particular limitation, values of the input capture bits ICFA, ICFB, value of the buffer enable bit and value of the capture interrupt enable bit EICC are supplied to the interrupt control circuit 19. Therefore, whether the timer circuit 7 is set to the second mode or not is determined depending upon the buffer enable bit BUFE. When the flag "1" is raised on the impact capture bits ICFA and ICFB, respectively, under the condition where interrupt permit flag is set to the capture interrupt enable bit EICC and the second mode is set, the interrupt control circuit 19 forms an interrupt signal IRQk. In response to the interrupt signal IRQk, the CPU 2 reads the data held in the two capture registers 11 and 12 like in the embodiment of FIG. 1, and finds by calculation the time of pulse width of the event pulse EP0. In this case, though there is no particular limitation, "1" is written in advance onto the input edge bit IEGA and "0" is written in advance onto the input edge bit IEGB. Even in this embodiment, the initial data is written onto the control register 15 by the CPU 2. The input capture bits ICFA and ICFB may be reset by writing data onto the bits by the CPU 2, or may be reset by reset signals that are not shown.

In FIG. 3, furthermore, the external terminals may be commonly used for supplying the event signals EP$_0$, EP$_1$ and for coupling to the parallel communication interface 6. That is, the external terminals for supplying the event signals may be commonly used as the ones for other signals. In this case, the micro computer 1 is provided with a register to which the write access can be made by the CPU 2. Based on a predetermined bit of the register, therefore, it is determined whether the common external terminals are coupled to the event input node of the timer unit 7 or to the input or output node of other circuit. This can be easily achieved, for example, by the selection circuit controlled by the above predetermined bit.

In the above-mentioned embodiment, the selection circuit 20 for selecting the control register and input capture register, is provided in the timer unit. However, the place for providing the selection circuit needs not necessarily be limited to the timer circuit but may be elsewhere in the micro computer 1. It is further allowable to supply the read/write signal to the selection circuit, to supply the register selection signal to the input capture register at the time of reading, and to supply the register selection signal to the control register at the time of reading or writing. Moreover, the selection circuit 20 is in no way limited to the above-mentioned embodiment only but can be realized in a variety of forms. Similarly, the selection circuit 17, change-over circuit 18, and registers 11, 12 and 15 may be constituted in a variety of forms.

Instead of the multiplexer (selection circuit) 17, furthermore, the capture register 11 and/or the capture register 12 may be provided with a selection function which performs selection operation according to a selection signal Sel.

According to the aforementioned embodiments, the following functions and effects are obtained. (1) When a selected event is generated an is followed by the generation of a second, selected event that should draw attention, the counted data latched by the capture register 11 according to a change in an event pulse EP0 that responds to the generation of the first selected event is saved to another capture register 12 via the multiplexer 17 before it is renewed by a change of the event pulse that responds to the generation of the second selected event. Therefore, even when two or more selected events are generated within a short time interval, there is required no processing in which access is made to the CPU 2 to save the data latched in the capture register 11 to the RAM 4 before the latched data is renewed. Namely, the data held in the capture registers 11 and 12 are freely read out at a later time to reliably obtain data related to a predetermined pulse width or an interval between events. In measuring the pulse width having a relatively small duration or in measuring the change of input pulses that a relatively narrow interval, therefore, precision for measuring the time of generation or change of a selected event and a minimum time interval for measuring events that are generated consecutively is not limited to a time required by the CPU 2 to make access to the capture register 11 or 12 to save the latched data. Furthermore, the limit or precision for measuring time of the timer unit 7 is prevented from becoming very coarse for the period of basic clock signals of the free-running counter, contributing to improving the reliability of the timer unit.

(2) In addition to the first capturing function for assigning one capture register to one event pulse, there is selectively realized the second capturing function which utilizes another capture register 12 as the one for saving the latched data of the capture register 11 in order to improve precision for measuring the time data or improve limit for measuring the minimum time.

(3) The data latch timing for the individual capture registers can be programably set by the latch timing control circuit according to a change in the event pulse. Therefore, selected counted data can be obtained in response to any change in the event pulses.

(4) The data held in the register are transferred to another register via a bus b (a bus for transferring the data held in the capture register 11 to the capture register 12 or the save register 21 in the embodiments of FIGS. 1 and 4) which is different from an internal bus that is coupled to the CPU 2. Therefore, while the data are being transferred, the CPU is allowed to execute the processing using the internal bus. Therefore, the processing time of the micro computer can be shortened as a whole.

In the foregoing was described the case where the invention accomplished by the present inventors was adapted to the micro computer in a field of art that served as the background of the invention. However, the invention is in no way limited thereto only but can further be adapted extensively to universal pulse processors, timer units, as well as to servo controllers. The present invention can be adapted to those for measuring intervals among required events and for measuring the pulse widths.

Further, briefly described below are the effects obtained by a representative example of the inventions disclosed in this application.

That is, provision is made of a save register which receives timekeeping data latched in the capture register and latches them so that they can be read at any time, and the timing for latching the data to the save register is controlled being interlocked to a change in the event pulse. Therefore, there is no need of effecting the processing in which the content of the capture register is saved by the CPU after every generation of the event. In measuring the pulse width having a relatively small duration or in measuring the change of input pulses that are generated within a relatively narrow time interval, therefore, precision for measuring the time of generation or change of a selected event and a minimum time interval for measuring events that generate consecutively is not limited to a time required by the CPU to make access to the capture register to save the latched data. Furthermore, the limit or precision for measuring time of the timer unit is prevented from becoming very coarse for the period of basic clock signals of the free-running counter, contributing to improving the reliability of the timer unit.

Moreover, the timer unit is provided with general applicability. That is, a capturing function is provided in which selection means is provided to selectively give either the timekeeping data latched by one capture register or the timekeeping data produced from the timekeeping means to the other capture register. Additionally, the event pulses of the two systems are changed over by the selection means to control the data latch timings of the two capture registers based on the same event pulse depending on the condition for selecting the timekeeping data latched by one capture register, to assign one capture register for one event pulse. In order to improve the precision for measuring the time data and to improve limit for measuring a minimum time, another capturing function is selectively realized to utilize the other capture register as a save register for saving the data latched by one capture register.

What is claimed is:

1. A timer unit comprising:
   counter means, coupled to receive a clock signal, for counting the clock signal to produce count data;
   a capture register, coupled to an output of the counter means and responsive to a first trigger signal, for latching the count data which the counter means has counted at an occurrence of the first trigger signal, wherein the capture register outputs the count data at its first output node in response to an access thereof;
   a save register, coupled to a second output node of the capture register and responsive to a second trigger signal, for latching the count data latched by the capture register, wherein the save register outputs the count data at its output node in response to an access thereof;
   an input terminal adapted for receiving an event pulse having a first edge and a second edge;
   first latch timing control means, coupled to the input terminal and responsive to each of the first and second edge of the vent pulse, for generating the first trigger signal to the capture register, wherein the capture register is responsive to the first trigger signal based on the first edge of the event pulse and latches the count data which the counter means has counted at the occurrence of the first trigger signal based on the first edge of the event pulse, and wherein the capture register is responsive to the first trigger signal based on the second edge of the event pulse and latches the count data which the counter means has counted at the occurrence of the first trigger signal based on the second edge of the event pulse; and
   second latch timing control means, coupled to the input terminal and responsive to the second edge of the event pulse, for generating the second trigger signal to the save register, wherein the save register is responsive to the second trigger signal and latches the count data which the capture register has latched in response to the first trigger signal based on the first edge of the event pulse.

2. A timer unit according to claim 1, wherein the counter means is a free running counter.

3. A timer unit according to claim 1, wherein the timer unit is formed on a semiconductor substrate.

4. A timer unit comprising:
   a first input terminal for receiving a first event pulse having a first and second levels, the first event pulse having a first edge changing from the first level to the second level and a second edge changing from the second level to the first level;
   a second input terminal for receiving a second event pulse having a first level and a second level, the second event pulse having a first edge changing from the first level to the second level and a second edge changing from the second level to the first level;
   counter means, coupled to receive a clock signal, for counting the clock signal to produce count data;
   a first capture register, having input nodes coupled to the counter means, first output nodes and second output nodes, the first capture register being responsive to a first trigger signal and including means for latching the count data which the counter means has counted at an occurrence of the first trigger signal;
   first latch timing control means, coupled to the first input terminal and response to a selected edge of the first event pulse, of the first latch timing control means including means for generating the first trigger signal to the first capture register;
   first selection means, having first input nodes coupled to the counter means, second input nodes coupled to the second output nodes of the first capture register and output nodes, for coupling the first input nodes thereof to the output nodes thereof in response to a control signal having a first level, the first selection means including means for coupling the second input nodes thereof to the output nodes thereof in response to the control signal having a second level;
   a second capture register having input nodes coupled to the output nodes of the first selection means and responsive to a second trigger signal, the second capture register including means for latching data on the input nodes thereof;
   second selection means, having a first input coupled to the first input terminal, a second input coupled to the second input terminal and an output and for coupling the second input thereof to the output thereof in response to the control signal having the first level, for coupling the first input thereof coupled to the output thereof in response to the control signal having the second level;
   second latch timing control means, having an input coupled to the output of the second selection means and responsive to a selected edge of the first or second event pulse, for generating the second trigger signal to the second capture register; and
   a control register coupled to the first and second selection means and coupled to the first and second latch timing control means, the control register including,
   a mode control bit having a first state and a second state, where the first state enables a first mode which the control signal of the first level is generated, and the second state enables a second mode which the control signal having the second level is generated, a control bit for determining to which edge of the first event pulse the first latch timing control means responds, said a control bit for determining to which edge of the first or second event pulse the second latch timing control means responds, and wherein, when the mode control bit is in the second state, the first and second latch timing control means generate the first and second trigger signals to the first and second capture register, respectively, in response to the selected edge of the first event pulse, and the second capture register is responsive to the second trigger signal and latches the count data which the first capture register has latched before an occurrence of the second trigger signal while the first capture register is responsive to the first trigger signal and latches the count data which the counter means has counted at an occurrence of the first trigger signal.

5. A timer unit according to claim 4, wherein the counter means is a free running counter.

6. A timer unit according to claim 4, wherein each of the first and second capture registers has a predetermined address assigned thereto, and output the count data latched therein in response to access thereof.

7. A timer unit according to claim 4, wherein the timer unit is formed on a semiconductor substrate.

* * * * *

UNITED STATES PATENT AND TRADEMARK OFFICE
CERTIFICATE OF CORRECTION

PATENT NO. : 5,218,693
DATED : June 8, 1993
INVENTOR(S) : Kiyoshi Ogita It is certified that error appears in the above-identified patent and that said Letters Patent is hereby corrected as shown below:

Claim 1, column 13, line 48, delete "edge" and substitute therefor --edges--. "vent" should read --event--.

Claim 4, column 14, line 27, delete "response" and substitute therefor --responsive--.

Signed and Sealed this

Fourth Day of January, 1994

*Attest:*

BRUCE LEHMAN

*Attesting Officer*      Commissioner of Patents and Trademarks